US011704150B2

(12) United States Patent
Will et al.

(10) Patent No.: US 11,704,150 B2
(45) Date of Patent: Jul. 18, 2023

(54) SYSTEMS AND METHODS FOR DYNAMIC JOB PERFORMANCE IN SECURE MULTIPARTY COMPUTATION

(71) Applicant: Acronis International GmbH, Schaffhausen (CH)

(72) Inventors: Mark A. Will, Singapore (SG); Sanjeev Solanki, Singapore (SG); Kailash Sivanesan, Singapore (SG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 404 days.

(21) Appl. No.: 16/884,630

(22) Filed: May 27, 2020

(65) Prior Publication Data

US 2021/0373940 A1 Dec. 2, 2021

(51) Int. Cl.
*G06F 9/48* (2006.01)
*G06F 21/62* (2013.01)

(52) U.S. Cl.
CPC ........ *G06F 9/4818* (2013.01); *G06F 21/6218* (2013.01)

(58) Field of Classification Search
CPC ............... G06F 9/4818; G06F 21/6218; G06F 2209/5011; G06F 2209/5017; G06F 9/5027; Y02D 10/00
See application file for complete search history.

(56) References Cited

U.S. PATENT DOCUMENTS

| 7,051,330 B1* | 5/2006 | Kaler | G06F 9/4843 |
| | | | 718/103 |
| 2008/0069239 A1* | 3/2008 | Yan | H04N 19/59 |
| | | | 375/240.21 |
| 2017/0208150 A1* | 7/2017 | Ekbote | H04L 67/568 |
| 2018/0139045 A1* | 5/2018 | Furukawa | H04L 9/085 |
| 2019/0163842 A1* | 5/2019 | Pal | G06F 16/252 |
| 2020/0082898 A1* | 3/2020 | Jin | G06F 3/0644 |
| 2020/0380057 A1* | 12/2020 | Smit | G06F 16/951 |
| 2021/0365812 A1* | 11/2021 | Bennati | G06N 20/00 |

* cited by examiner

*Primary Examiner* — Jorge A Chu Joy-Davila
(74) *Attorney, Agent, or Firm* — ArentFox Schiff LLP; Michael Fainberg (57) ABSTRACT

Disclosed herein are systems and methods for dynamic job performance in secure multiparty computation (SMPC). The method may comprise receiving an SMPC query that indicates a processing job to be performed on a data input. The method may split the data input to generate a plurality of partial data inputs, based on parameters and the query type of the SMPC query. The method may generate a plurality of jobs to perform on the plurality of partial data inputs and determine a combined result of the processing job. The method may adjust the amount of worker processes in a worker pool based on at least one of: required computation, time of day, date, financial costs, power consumption, and available network bandwidth.

19 Claims, 7 Drawing Sheets

SYSTEMS AND METHODS FOR DYNAMIC JOB PERFORMANCE IN SECURE MULTIPARTY COMPUTATION

FIELD OF TECHNOLOGY

The present disclosure relates to the field of secure multiparty computation (SMPC), and, more specifically, to systems and methods for dynamic job performance in SMPC.

BACKGROUND

Secure multiparty computation (SMPC) frameworks allow multiple parties to jointly compute a function, such that their inputs remain private. Data is protected by being split into secret shares, where each party receives a subset of these shares, therefore each party cannot see the real data. For example, 10 can be split into 3+2+5.

Although many types of SMPC frameworks exist, they are primarily built around having a singular use-case, and may have a known amount of data inputs and outputs. These frameworks often use custom compilers that (1) can lack the ability to use dynamic variables for certain operations, (2) do not always work with large amounts of data, and (3) may have issues with loading data from dynamic sources.

SUMMARY

Thus, aspects of the present disclosure describe methods and systems for dynamic job performance in SMPC. The aspects allow somewhat static SMPC frameworks to be dynamic and flexible, suiting a cloud native deployment model. Another benefit of the aspects is improved query performance and system scalability, allowing for much faster compute times than conventional frameworks.

In one exemplary aspect, a method for dynamic job performance in secure multiparty computation (SMPC) may comprise receiving an SMPC query that indicates a processing job to be performed on a data input. The data input may (1) already exist within the system (e.g. local database), (2) be retrieved from another system (e.g. a blockchain or remote database), or (3) be included as a parameter of the query. The method may determine a query type of the SMPC query and parameters of the data input. The method may split the data input to generate a plurality of partial data inputs, based on the parameters and the query type. The method may generate a first plurality of jobs to perform on the plurality of partial data inputs. The method may push each of the first plurality of jobs into a worker queue. The method may perform each of the first plurality of jobs in the worker queue on a respective partial data input of the plurality of partial data inputs to determine a plurality of data outputs. In response to determining that the query type indicates that the plurality of data outputs should be joined or require further processing, the method may generate a second plurality of jobs to perform on the plurality of data outputs. The method may also require the data inputs if required for the second plurality of jobs. The method may push each of the second plurality of jobs into the worker queue. The method may then perform each of the second plurality of jobs in the worker queue on a respective partial data output of the plurality of data outputs to determine a combined result of the processing job.

In some aspects, the SMPC query comprises respective data inputs from a plurality of nodes and the SMPC query is received by each node of the plurality of nodes from a client controller. The request from the client controller may traverse some gateway/s, or proceed directly to the nodes.

In some aspects, the node comprises a pool of worker processes that perform the first plurality of jobs and the second plurality of jobs, wherein a respective worker process of the pool may perform a respective job of the first plurality of jobs and a respective job of the second plurality of jobs. In some aspects, additional jobs (e.g., a third plurality of jobs and more) may be required. In some aspects, a particular job may require several iterations to perform. In some aspects, the second plurality of jobs is an iteration of the first plurality of jobs. In some aspects, the first plurality of jobs is the same as the second plurality of jobs.

In some aspects, a worker from a pool of worker processes on a first node of the plurality of nodes communicates with a corresponding worker from another pool of worker processes on a second node of the plurality of nodes, in order to perform an SMPC function, and other functions including but not limited to input alignment, fault detection and recovery.

In some aspects, the method may increase an amount of worker processes in the pool of worker processes in response to receiving the SMPC query and may decrease the amount of worker processes in the pool in response to determining the combined result.

In some aspects, the amount of worker processes may be proportional to the amount of jobs in a worker queue, or may abide by a hard limit (e.g., a maximum number of workers), and may also take into consideration parameters such as required computation (e.g., jobs to be processed or need for data), date/time of day (e.g., more/fewer workers may be needed at night or weekends), financial costs, power consumption, or available network bandwidth.

In some aspects, the first plurality of jobs and the second plurality of jobs may comprise at least one of: (1) sorting, (2) filtering, (3) mapping, (4) reducing, or (5) performing a mathematical operation.

In some aspects, the combined result is stored as one of a secret share, a hash value, or a plaintext value, where the combined result is the output from the final plurality of jobs.

In some aspects, subsequent to determining the plurality of data outputs as a plurality of secret shares, the method may transmit a portion of the plurality of data outputs to remaining nodes of the plurality of nodes as secret shares. In some aspects, the method may receive, from each of the remaining nodes, respective secret shares, and may join with the plurality of data outputs, the transmitted portion of the plurality of data outputs with the received respective secret shares, to obtain the plaintext combined result.

In some aspects, the method may cache the SMPC query and the combined result. The method may receive another SMPC query. In response to determining that the another SMPC query matches the SMPC query, the method may output the combined result from cache.

In some aspects, the method may cache the SMPC query and the combined result. The method may receive an update to the input data for a cached result from a previous SMPC query. The method may (1) delete the cached result, (2) mark the cached result as expired, but may still allow it to be returned (e.g. for a preview of the results, or to provide provenance), or (3) use the previous cached result and the new data inputs to update the result, with the update either running instantly, at a scheduled time, when the system is free, or when a query is retrieved requiring the results.

In some aspects, the method may cache the plurality of partial data inputs and the first plurality of jobs. The method may receive another SMPC query comprising another data input. The method may split the another data input into a third plurality of jobs such that the third plurality of jobs partially comprises of the first plurality of jobs and another plurality of jobs. The method may determine that the first plurality of jobs is cached, and may only perform the remainder of the third plurality of jobs on the remainder of another plurality of partial data inputs.

In some aspects, subsequent to receiving the SMPC query, the method may receive another SMPC query, and may append another data input of the another SMPC query to the data input of the SMPC query. This enables multiple queries to be run in parallel.

In some aspects, the method may push jobs into the worker queue associated with an SMPC query and push jobs of another SMPC query into the worker queue, potentially allowing them to run in parallel. Furthermore, given multiple SMPC query support and parallelisation, the method may support multitenancy, with different sets of users utilising the same resources.

In some aspects, the worker queue may allow for some jobs to be prioritized over others, which can be achieved using a range of concepts such as (1) an outright priority queue, (2) allowing low priority jobs to be processed alongside high priority jobs while having less frequent pops from the worker queue (e.g., similar to process scheduling in kernels), or (3) having a worker queue for each priority level with less frequent pops from the lower priority worker queue.

In some aspects, the data input is a secret share, which may be received from a client controller or remote source, that has additional encoding (e.g., metadata) to facilitate searching (e.g., reduce lookup space within an index) within the secret data inputs.

In some aspects, generating the first plurality of jobs to perform on the plurality of partial data inputs may further comprise automatically compiling at least one program to execute on the plurality of partial data inputs, wherein any compiled programs are cached at both the worker process, and the compiler process, thus increasing future query performance.

In some aspects, the data input is one of: (1) an output from a secure function, (2) data stored in an internal database, (3) data retrieved from an external source (e.g. a blockchain system) or (4) data provided as an argument for an SMPC query.

In some aspects, the method may output, to a client controller, the progress of job completion (e.g., percentage complete or estimated time left), wherein completion of each respective job of the first plurality of jobs and the second plurality of jobs is monitored (along with any other jobs running in the system) and displayed as progress metrics.

In some aspects, in response to retrieving the progress of job completion, a user with necessary permissions may decide to dynamically increase the systems' performance, either permanently or temporarily. For example, by allowing the system to create more workers in the plurality of worker pools or by changing priority of other jobs.

In some aspects, the method may verify each respective result of the plurality of data outputs subsequent to performing each of the first plurality of jobs, and in response to detecting an error in the respective result, may re-perform a respective job of the first plurality of jobs on a respective partial data input of the plurality of partial data inputs, wherein the respective job and the respective partial data input correspond to the respective result with the error.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for dynamic job performance in SMPC. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions are established for the terms used in the present disclosure.

Compiling is the act of taking a program's source code, usually in a human readable format, and converting the source code into byte/machine code, such that a machine can understand it.

Programs, which are used interchangeably in the present disclosure with functions, compute an output when given an input.

Secret Inputs, which are used interchangeably in the present disclosure with function arguments, are inputs secured using SMPC secret sharing techniques.

Complex Functions are functions that require other functions to be computed first, before they can be used. For example, standard deviation is a complex function that requires the mean to be computed first.

A Worker Group is a group of worker processes, on each one of the SMPC parties, which need to communicate with one another to compute some SMPC function.

Figure 1:
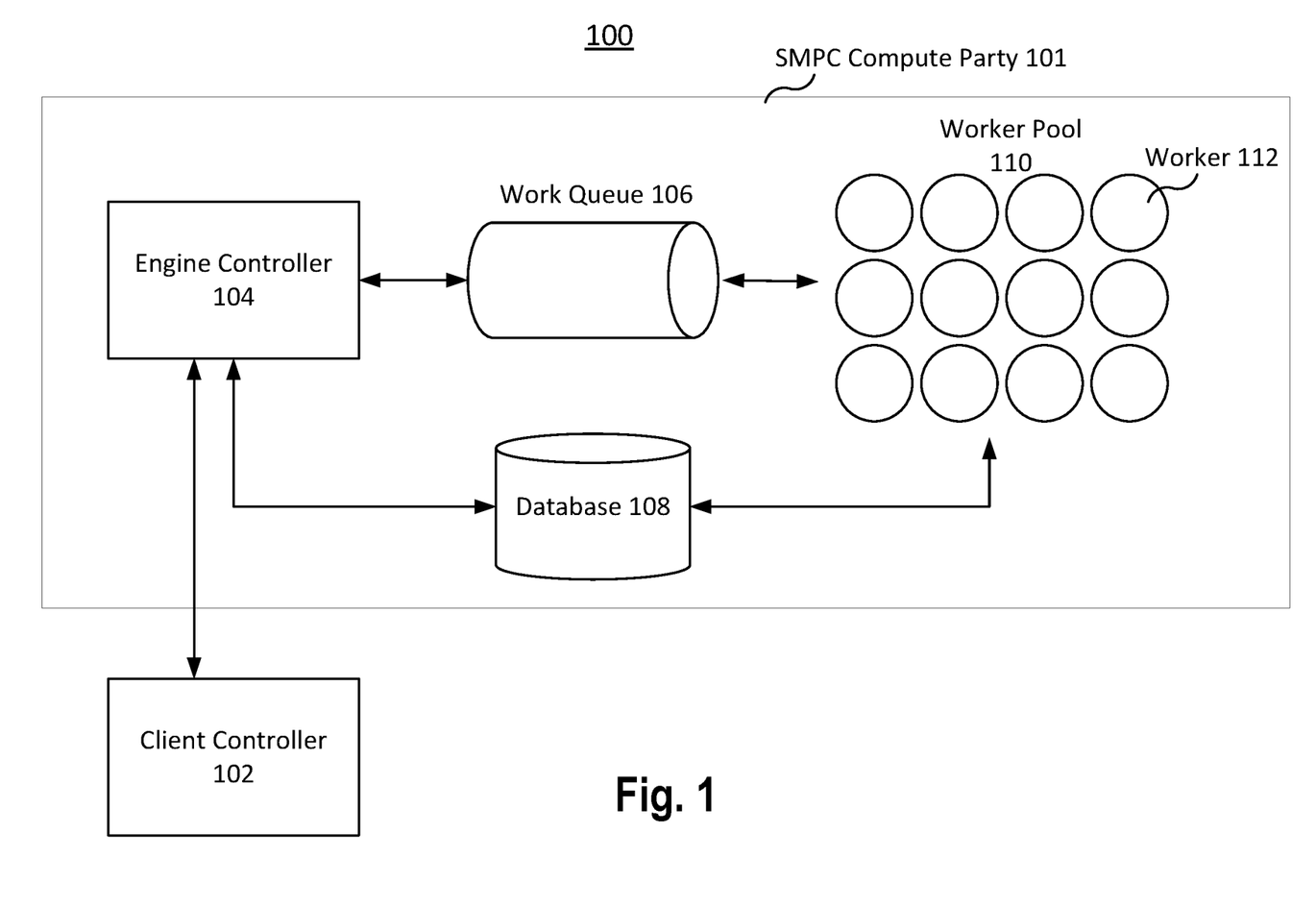
FIG. 1 is a high-level block diagram illustrating a system for dynamic job performance in SMPC, in accordance with aspects of the present disclosure.

FIG. 1 is a high-level block diagram illustrating system 100 for dynamic job performance in SMPC, in accordance with aspects of the present disclosure. System 100 comprises client controller 102, which can run on any platform or web browser, or even on an on-premise node, and SMPC compute party 101. Party 101 comprises engine controller 104, worker queue 106, database 108, and worker pool 110, which further comprises a plurality of workers 112. In FIG. 1, the controller logic of a particular party such as party 101 exists in three core locations: (1) the client, (2) the main engine controller, and (3) within the worker processes. In an exemplary flow for querying, client controller 102 initializes a query and sends the query type and some parameters of the query (e.g., the data input or the data input source) to engine controller 104 on each party (e.g., party 101). Engine controller 104 evaluates the query, splits the query into jobs, and pushes the jobs into worker queue 106. The worker processes (e.g., worker 112) in worker pool 110 pop from work queue 106, evaluate a received job and respective inputs, and execute the job. The result from worker 112 can be stored in database 108, or sent directly back to engine controller 104. Each one of the components can run on different resources (e.g., virtual machines and/or devices) and worker pool 110 can be made up of worker processes on different resources. For example, a subset of workers 112 may be stored on a first server and another subset of workers 112 may be stored on a second server.

System 100 represents a complete controller comprising the elements 101-112. The controller is configured to handle the following tasks listed in [45]-[59].

System 100 has the ability to dynamically change parameters of a program that has either been supplied by client controller 102, or is predefined in SMPC compute party 101 and recompile the program (if the program requires compilation). The compilations may be cached in some aspects so that future programs with the same parameters do not need to be compiled again, increasing performance.

Data can be uploaded into system 100 and securely stored in a database (e.g. database 108) to be used later in a SMPC platform. Data integrity is maintained through the use of message authentication codes. Data can also be retrieved from a third-party system, (e.g., a blockchain network or remote database) by engine controller 104 and worker 112.

The secure function/program executed by workers 112 can dynamically read data inputs, and output results back to the controller. This allows data to be securely stored in a database (e.g. database 108) when not in use, and for results to be logged for provenance and caching purposes. Furthermore, programs do not need to be recompiled for differing inputs or arguments.

Given the computational intensity of computing data in a secure environment, the engine controller 104 can automatically split a query into batches (i.e., into jobs) and push them into work queue 106. Each worker 112 in the worker pool 110 may pop a given batch from work queue 106, thus processing a subset of input data required for the overall query. This allows the query batches to be run in parallel, giving greater performance for a single query.

The controller can link the output of one secure program (or function) to be the input to another, thus allowing programs to be linked together. For example, standard deviation requires the mean value, which may be calculated via one program, and inputted into another that computes the standard deviation.

Given the automatic parallelisation feature in [48], the controller supports multiple queries running at once (may be in parallel depending on the number of workers 112 in pool 110), even if submitted by different users with different functions. Queries may be started with varying levels of priority, to allow high priority queries to have greater performance over lower priority queries, even if running together on the same resources. Work queue 106 and worker pool 110 guarantee that SMPC compute party 101 does not exhaust available resources when multiple queries are running at once.

The controller 104 and database 108 can securely join different datasets (i.e., database tables) together through the use of plaintext tokens that are identifiers within each individual dataset. If tokens cannot be used, the controller can use a SMPC framework to join datasets together. Results of joins can be stored back in the database 108 for future use. A user of system 100 may further define a dataset, such that when data is uploaded, the dataset is automatically joined with different sources already in the database, similar to a view in databases.

Given the resources required and complexity of running secure queries, the controller can provide feedback to the user including but not limited to execution status, current progress, and estimated time left.

Using the controller allows different SMPC frameworks to be used (within reason as data inputs need to be supported) and allow different secure computing techniques to be used such as garbled or arithmetic circuits. One framework may offer greater performance over another for some query types, thus it is desirable to use the fastest option.

The controller may provide access control through identifying different users and profiles, restricting their access, including but not limited to functions, data, number of queries per time interval, number of outputs, and administrative settings. Furthermore, with multiple query support, parallelisation and access controls, the controller may support a multitenancy model.

The controller can provide leak detection functionality. For example, if a query runs under a threshold amount of records, input data may be leaked to other parties. Thus, the controller can prevent queries from running under a threshold amount of records. For a system where dynamic user functions (e.g., a program uploaded by client controller 102) are allowed, SMPC compute party 101 may also proof the functions to limit the risk of data leakage. The proof may be automatic, or manual by an administrator of SMPC compute party 101, or some combination of both.

With SMPC computation performed over multiple parties, network failure or any other error during execution has a higher chance of occurring. The controller may thus perform backups and error recovery automatically.

To improve accuracy and possibly performance, the controller may utilize the client controller 102 for stages of execution. For example, with the function standard deviation, the mean is required. Client controller 102 can first get the result of mean and then provide a secret share of the mean and send it back to the SMPC parties (e.g., party 101), which can then compute the standard deviation.

On the upload of new data from client controller 102, or the updating/appending of data, the engine controller 104 may automatically run predefined queries over the data and cache the results back in database 108. In some aspects, this occurs when no other queries are being handled by system 100, or by setting the lowest priority when pushing to work queue 106. Thus, when a user submits a query via client controller 102, there is a higher chance the results are already available—improving the users' perceived performance of the system.

For large datasets, the query performance may be slow. However, certain datasets simply grow over time (e.g., storage of data acquired from Internet of Things (IoT) devices on a timely basis). The controller may retrieve old query results from database 108 and only run functions on the new data, such that a given function does not have to be rerun over the entire dataset.

Figure 2:
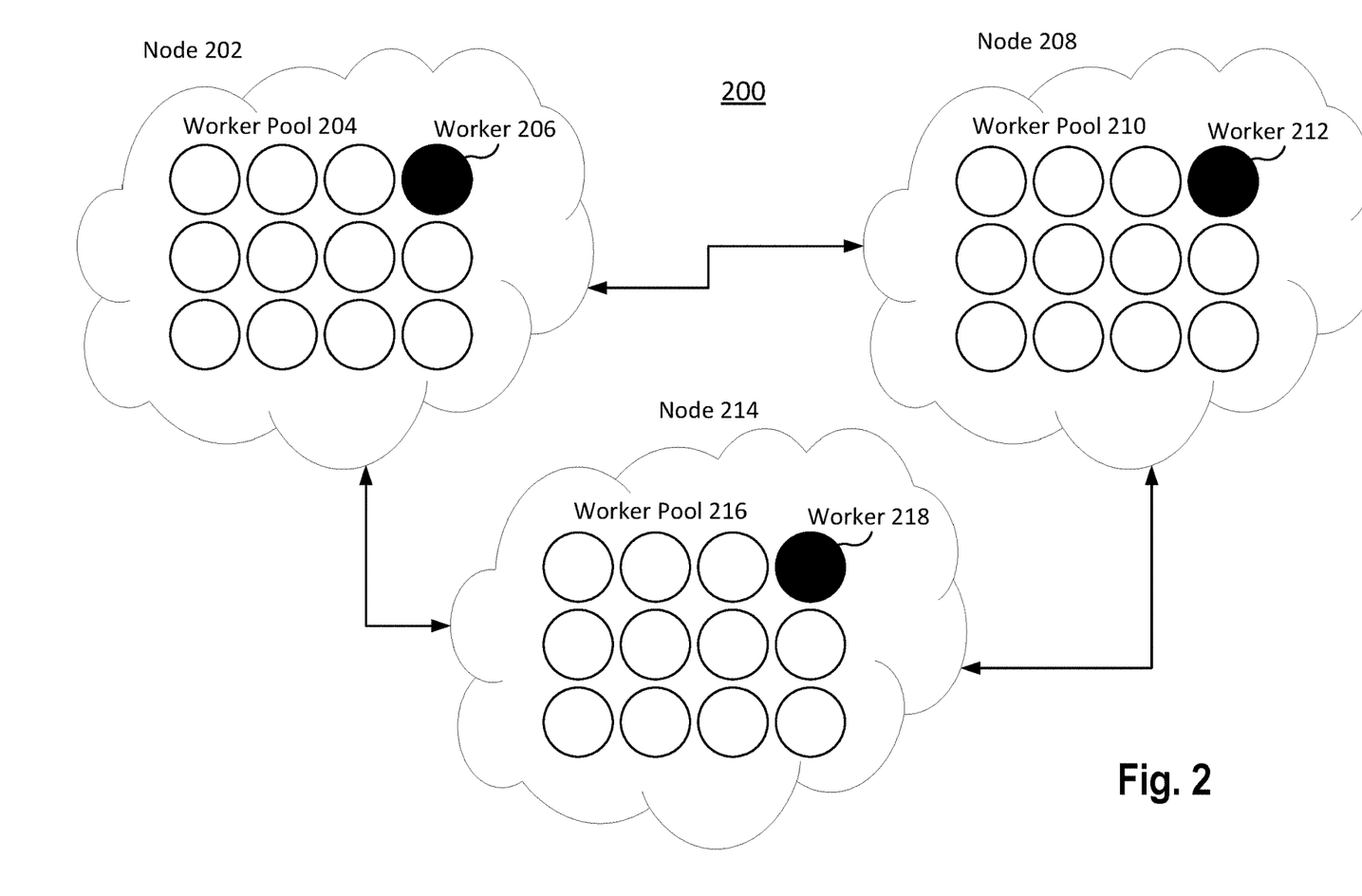
FIG. 2 is a block diagram illustrating worker processes interacting across different nodes collectively performing SMPC protocols, in accordance with aspects of the present disclosure.

FIG. 2 is a block diagram illustrating worker processes interacting across different nodes collectively performing SMPC protocols, in accordance with aspects of the present disclosure. In FIG. 2, nodes 202, 208 and 214 represent parties such as party 101. Each node comprises a worker pool (i.e., worker pool 204, 210, and 216) that is comparable to worker pool 110. Furthermore, each worker process such as worker 206 on each party can have a corresponding worker on the other parties. For example, workers 206, 212, and 218 may communicate with each other when computing an SMPC protocol and exchange details. In some aspects, each controller may advertise which job is on which worker, so that the workers on the different parties can connect with each other, or it could be predefined for greater performance.

Suppose that workers 206, 212, and 218 are connected to each other. When the controller assigns a job to worker 206, the same job will be assigned by the controllers associated with workers 212 and 218. It should be noted that each worker in a party may have a different IP address and port, which allows singular communication between workers.

Consider a scenario in which node 202, node 208, and node 214 represent software companies that want to determine the combined average of the salaries of their software engineers. However, the respective nodes may not want to reveal the salary information to one another, and simply wish to know how they compare to the overall average. This may be, for example, because the individual companies wish to determine whether their salaries are competitive in the market. Note that the three companies could also outsource the computation, where the system is managed by different entities. The salaries and function output in this case would still remain private from the computation entities.

Using SMPC principles, the client controllers of each node may split the data input into a number of portions equal to the number of nodes that are communicating with one another. In this example, because there are only three nodes, the client controllers (e.g., client controller 102) split their respective data inputs into three portions, which are secret shares. Each node may have a dataset comprising of a plurality of salaries for each software engineer at the respective company. For example, the dataset for node 202 may comprise a 1×10 array of 10 salaries for their 10 software engineers. For simplicity, suppose that each of the other nodes also only have 10 software engineers (although the size of the datasets may of course vary in some aspects). The client controller of each node will upload its own dataset into the system comprising of node 202, node 208, and node 214, thus the dataset is split into secret shares, and partially stored on each node. For example, in the dataset of node 202, the first element may be $90 k. The client controller of node 202 generates three elements that read $20 k, $40 k, and $30 k. When added, these elements produce a sum of $90 k. However, when considered individually, one cannot determine the original value.

The client controller of each node may then wish to combine the three datasets discussed above into one data input (a union). In this example, the data input may be an 1×30 array comprising 30 sub-salaries (i.e., portions of the original salaries from each of the original datasets). The client controller may each then send an SMPC query that indicates a processing job to be performed on the data input. For example, the processing job may be to determine the average associated with the data input. It should be noted that the data input received by the engine controller of each node is linked. In other words, the average is to be determined of all of the original salaries across the three companies.

The method may determine a query type of the SMPC query and parameters of the data input. A query type indicates whether the query involves performing a complex function or a simple mathematical function (e.g., addition). For example, the engine controller of each node may determine that the query involves determining an average, which is a complex function because it involves performing several mathematical operations instead of one. In terms of the attributes of the data input, the engine controller may determine how many other nodes have a portion of the data input and the size/layout of the dataset. The engine controllers 104 and databases 108 on each plurality of nodes can perform the union on the secret shares previously uploaded by the client controllers of node 202, node 208, and node 214.

In some aspects, the data input may include additional information such as in an extra column. For example, rather than only software engineers, the companies may provide salaries of hardware engineers as well and may want to know the average for each professions salaries and the average of all salaries. In such a case, the parameters of the data input may indicate the number of rows and columns in the data input and the number of rows and columns for each profession. The engine controller may analyze each data input to determine classifications of portions of the data input (e.g., rows 1-15 represent profession A and rows 16-30 represent profession B).

The engine controller may then split the data input, if necessary, to generate a plurality of partial data inputs, based on the parameters and the query type. The engine controller may generate a first plurality of jobs to perform on the plurality of partial data inputs. For example, each engine controller may determine that the job of determining an average can be split into multiple smaller jobs: determining a sum and dividing the sum by the total number of inputs, which can be split into smaller jobs depending on the size of the data input.

The engine controller may push each of the first plurality of jobs into a worker queue. A plurality of workers of each node may perform each of the first plurality of jobs in the worker queue on a respective partial data input of the plurality of partial data inputs to determine a plurality of data outputs. For example, if there are 30 inputs for each dataset, rather than having one worker perform 30 additions, each worker may be tasked with adding two numbers to generate an output. Because multiple workers are each performing a single operation, the results are acquired faster.

In response to determining that the query type indicates that the plurality of data outputs should be joined, the method may generate a second plurality of jobs to perform on the plurality of data outputs. For example, if 15 workers are tasked with adding two numbers, there are 15 output values. These output values alone cannot provide a mean because the mean is meant to be one number. Thus, the workers send the results back to the engine controller, which creates a second plurality of jobs. This plurality of jobs may again individually task each worker to add two or more output values. Those results are fed back into the loop with more small jobs until a single result is output. This result is then divided by the number of salaries in the data input in a last job, determined by the engine controller, to determine a mean. The secret shared mean values are exchanged back to the client connectors, which can then determine the final result.

In some aspects, the pool of worker processes communicate with a respective pool of worker processes on each of the plurality of nodes, and the results associated with the SMPC queries from each of the nodes are exchanged using tokens that identify a respective result, a respective node, and the SMPC query. For example, the final workers that determine a portion of the mean may be synchronized to exchange the results with tokens that serve as metadata that the respective workers can interpret.

In some aspects, the method may increase the amount of worker processes in the pool of worker processes in response to receiving the SMPC query and may decrease the amount of worker processes in the pool in response to determining the combined result. In some aspects, the amount of worker processes is proportional to an amount of jobs in the first plurality of jobs and the second plurality of jobs. For example, to perform the first set of additions, the engine controller may require 15 workers (where each performs an addition). In the second plurality of jobs (to add the output values), only 7 workers are needed. The engine controller may adjust the number of workers that need to be activated based on these values, or may abide by a hard limit (e.g. maximum number of workers), and may also take into consideration parameters such as required computation, date/time of day, financial costs, power consumption, or available network bandwidth.

In some aspects, the first plurality of jobs and the second plurality of jobs may comprise at least one of: (1) sorting, (2) filtering, (3) mapping, (4) reducing, or (5) performing a mathematical operation. For example, some functions may be required to determine a max value (e.g., a reducing function). Depending on the algorithm used, a job may involve performing a sort.

In some aspects, the combined result is stored as one of a secret share, a hash value, or a plaintext value. For example, the combined result of the mean may be needed to determine a standard deviation. Users may choose how they wish to store the output and in what format.

In some aspects, the engine controller may cache the SMPC query and the combined result. The method may receive another SMPC query. In response to determining that another SMPC query matches the SMPC query, the client controller may output the previous combined result. For example, if the companies choose to re-determine the average value, or choose to perform a function that involves determining the mean (e.g., standard deviation), rather than determining the mean again for the same data input, the engine controller may retrieve the cached value and have the client controller output the value.

In some aspects, the engine controller may cache the plurality of partial data inputs and the first plurality of jobs. The engine controller may receive another SMPC query comprising another data input (e.g., another set of salaries). The engine controller may split the another data input into a third plurality of jobs such that the third plurality of jobs comprises the first plurality of jobs and another plurality of jobs. The another data input may be split into another partial data inputs, which comprise the plurality of partial data inputs. The engine controller may determine that a partial result of performing the third plurality of jobs on the plurality of another partial data inputs is the plurality of data outputs from the first plurality of jobs, and may perform a remainder of the third plurality of jobs on a remainder of the plurality of another partial data inputs. For example, suppose that at a later time, the companies have employed new software engineers and have kept all other salaries the same as before. Rather than determining the salaries of all the software engineers by re-summing all values, the engine controller may re-use the original sum and simply add the new individual salaries.

In some aspects, subsequent to receiving the SMPC query, the engine controller may receive another SMPC query, and may append another data input of the another SMPC query to the data input of the SMPC query. For example, the engine controller may receive another data input from a different client controller. Based on the availability of workers, rather than performing the queries in series, the engine controller may push jobs into the worker queue 106 associated with the SMPC query and the another SMPC query in parallel. This worker queue 106 may take into consideration job priority or treat each job equally, and pop jobs accordingly.

In some aspects, generating the first plurality of jobs to perform on the plurality of partial data inputs further comprises automatically compiling at least one program to execute on the plurality of partial data inputs, wherein the at least one program is cached. For example, the workers may use a compiler to perform certain jobs. Because the compiler may already have some pre-compiled code, the engine controller may seek to use the pre-compiled code. If no code exists, new code may be compiled and cached. If all the workers require the same compiled code, it will be compiled once by the compiler, then given to the requesting workers.

In some aspects, the data input is one of: (1) an output from a secure function, (2) data stored in an internal database, (3) data retrieved from an external database, or (4) included as a parameter of the query In some aspects, the engine controller may output, to a client controller, a progress of job completion, wherein completion of each respective job of the first plurality of jobs and the second plurality of jobs is monitored and displayed as the progress to the user. This is particularly useful for very complicated functions that involve very large datasets.

In some aspects, in response to retrieving the progress of job completion, a user with necessary permissions may decide to dynamically increase the systems' performance, either permanently or temporarily. For example, by allowing the system to create more workers in the plurality of worker pools, or by changing priority of other jobs.

In some aspects, the engine controller may verify each respective result of the plurality of data outputs subsequent to performing each of the first plurality of jobs, and in response to detecting an error in the respective result, may re-perform a respective job of the first plurality of jobs on a respective partial data input of the plurality of partial data inputs, wherein the respective job and the respective partial data input correspond to the respective result with the error. For example, if a worker mistakenly adds two values and determines the message authentication code associated with a respective result is incorrect, the engine controller may request the worker to re-determine the sum.

Figure 3:
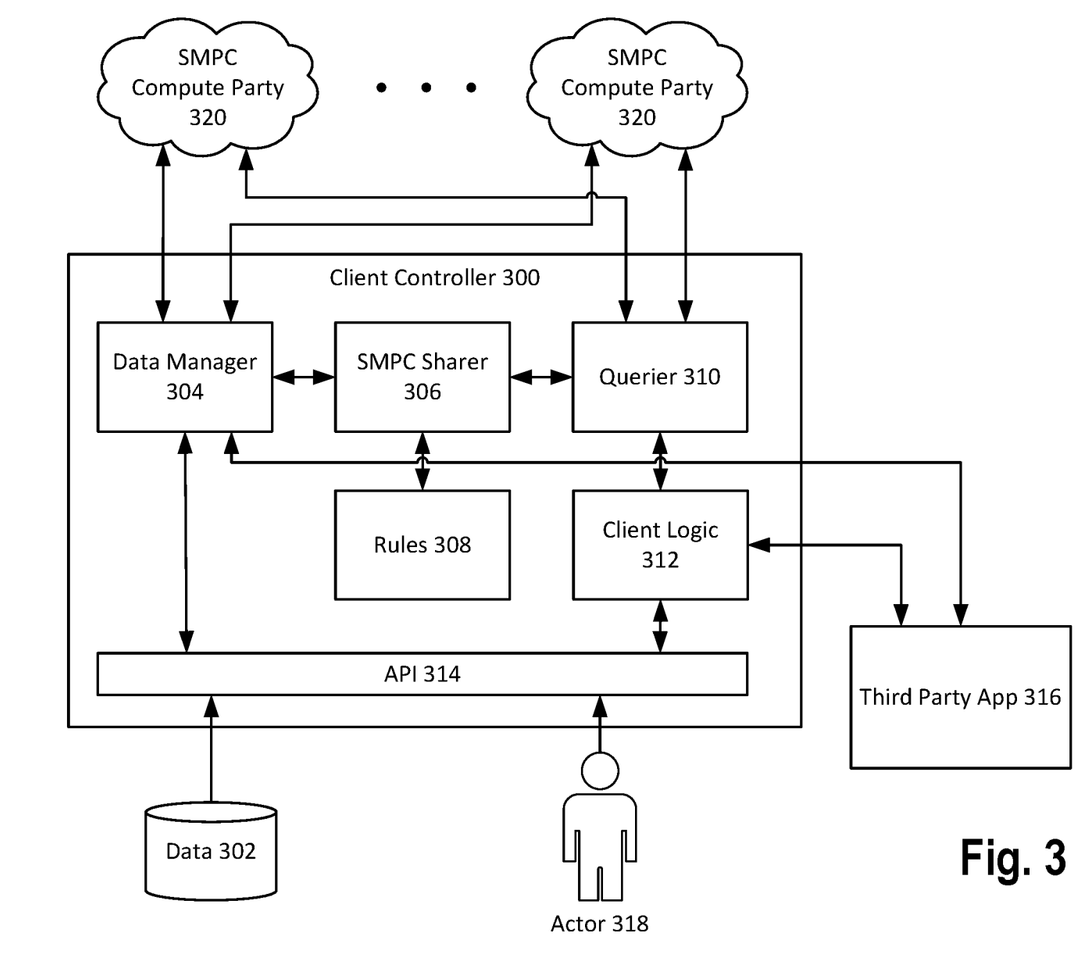
FIG. 3 is a block diagram illustrating an exemplary client controller, in accordance with aspects of the present disclosure.

FIG. 3 is a block diagram illustrating an exemplary client controller 300, in accordance with aspects of the present disclosure. Client controller 300 may be a service via APIs (e.g., API 314) or used as a library for other programs. API 314 provides a means for external services to use client controller 300.

Data 302 is a data source that calls API 314 of client controller 300 (comparable to client controller 102) to upload data. Data manager 304 is configured to upload, append, and delete datasets (or tables in the context of a database) within the system 100. Data manager 304 also returns metadata on existing datasets for a user to be able to query. It should be noted that for security purposes, at no point can a dataset (by default) be retrieved back from controller 300.

SMPC sharer 306 is configured to take plaintext data and split the data into secret shares if the data is specified as private (e.g., a column is specified as a secret column). SMPC sharer 306 calls the rules module (i.e., rules 308) to format the data before splitting. Rules 308 checks the data types being uploaded and performs conversions as necessary. For example, rules 308 may convert a string into a numerical format so that the string supports operations such as search. Rules 308 may also block certain types of information that are predetermined to be sensitive data (e.g., credit card numbers), or may remove rows contain missing values (e.g., a row with a column containing null).

Querier 310 is a module that handles the submission of queries to the SMPC engine such that complex functions are broken into simpler functions with their respective data portions as inputs. Querier 310 may join together the results of each single query once each has been completed. Querier 310 may use SMPC sharer 306 to convert any respective arguments to secret shares, or convert any results from the SMPC compute parties 320 that exist as secret shares to plaintext. Client logic 312 is for advanced queries where multiple queries are required to be joined together. These queries may be specified by the user, and client logic 312 may be responsible for parsing any user defined functions, before they are passed to the SMPC compute parties 320.

Third-party application 316 is example of an application which may use the client connector 300 as a library. This means that client controller 300 is built into app 316 and unnecessary API calls are thus not required. For example, if a website asks for a client to input data, the application 316 can run the client controller 300 within the web browser, such that the client's private input only leaves their device in secret shares.

Actor 318 may be a user calling client controller 300 to run a query. User 318 may, for example, use a web browser or another application to call client controller 300.

SMPC compute party 320, which is a party in the SMPC compute network, is connected to from client controller 300. There can be many different parties that client controller 300 talks to. SMPC compute party 320 is comparable to SMPC compute party 101 of FIG. 1.

Client controller 300 may connect to a proxy or gateway instead of the SMPC compute party 320 directly. All data (even in secret shares) can be encrypted such that only the SMPC compute party 320 can decrypt it—thus hiding the data from the proxies or gateways. This is particularly critical in the case where one gateway connects to all of the plurality of SMPC compute parties.

Figure 4:
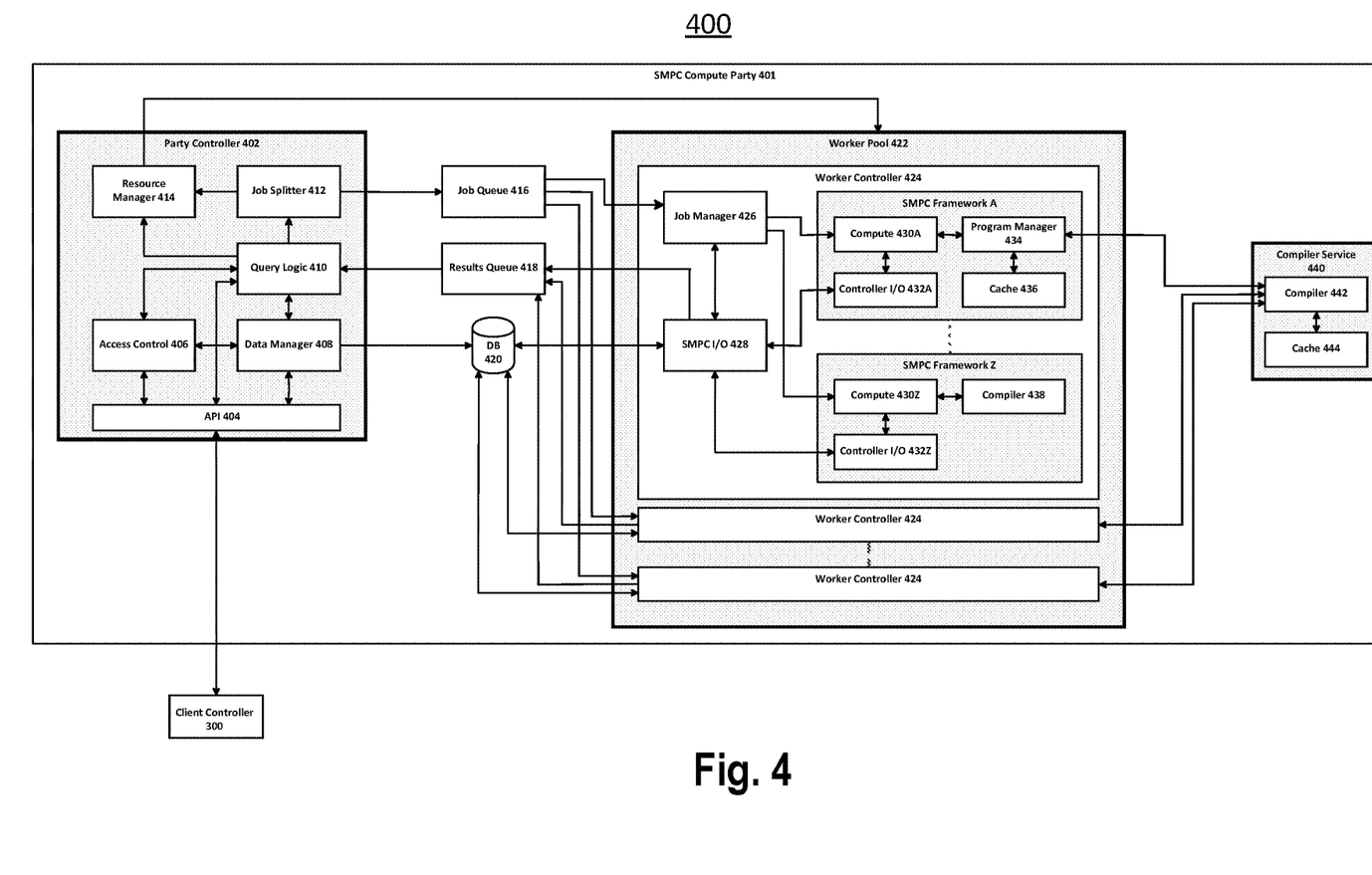
FIG. 4 is a detailed block diagram illustrating a system for dynamic job performance in SMPC, in accordance with aspects of the present disclosure.

FIG. 4 is a detailed block diagram illustrating system 400 for dynamic job performance in SMPC, in accordance with aspects of the present disclosure. SMPC compute party 401 is comparable to one of the SMPC compute parties 320. Party controller 402 is comparable to engine controller 104 of FIG. 1. API 404 allows client controller 300 to call party controller 402.

Access control 406 is configured to authenticate users (e.g., actor 318) and verify the actions the users are trying to perform. Because this module is on each party, each access control module on each party must agree with the action taking place before the action can actually be performed. If less than a threshold number of access control modules approve an action (e.g., less than half), the action will be denied. Single factor user authentication may be achieved by access control 406 using techniques including but not limited to: (1) unique password per node, (2) public key authentication, (3) pre-shared keys, (4) an SMPC-based password and comparison function (i.e., the password hash is split into secret shares), or (5) via a remote service (e.g., single sign-on). Multifactor authentication may also be achieved by access control 406.

Data manager 408 is an interface into the database 420, and is able to handle requests from the client in terms of creating, appending, filtering, etc., datasets. Data manager 408 also caches results, and can nullify any cached results if the dataset changes. Data manager 408 may further be configured to schedule when to start processing of certain configured queries (e.g., either straight away, or during quiet times as a form of pre-processing when no other queries are being handled).

Query logic 410 is a module that determines how queries are constructed. For example, query logic 410 determines whether a given query requires other queries to be run first, or, is the output from the query feed into another query. Query logic 410 may also cache results such that if a request is received with the same query and parameters, query logic 410 can check for a cached version via data manager 408.

Job splitter 412 is configured to divide a job that resolves a query and creating multiple jobs for the online workers in worker pool 422 to process. Job splitter 412 essentially transforms a single query into a parallel query (assuming the query supports being split into jobs). The jobs created by job splitter 412 are pushed into job queue 416, which takes jobs from party controller 402 and allows workers to pop them as they are available.

Resource manager 414 is a module that helps to reduce energy consumption of the system when it is idle, while also allowing for greater performance when the system is busy. Resource manager 414 helps maintain the size of process pools (e.g., worker pool 422) by adding and/or removing processes (e.g., workers 424) as needed. As discussed in FIG. 2, processes in different parties may connect to each other to perform certain actions. Accordingly, resource managers across the parties may communicate with each other to keep in sync with the number and configuration of processes.

Resource manager 414 can also increase the number of processes in a pool if a queue or store of required data is becoming empty. For example, a queue which contains precomputed Beaver triples used by SMPC protocols in SMPC frameworks A-Z drops below a threshold, the resource manager may increase the number of Beaver triple producers to refill the queue. The resource manager may also prioritize resources such that at night, some processes (e.g., Beaver triples producers) are running on a majority of the resources, but once queries enter the system 401, resources are returned back to workers 424.

Results queue 418 receives and holds results published by the workers 424. The results are then popped by query logic 410 of party controller 402. Database 420 of the party holds all information such as datasets, provenance records, caching of results, and authentication information. Database 420 can be a single or a distributed database such that the primary resource (for example a server) of a worker 424 can have a copy of database 420 for faster read times.

Worker pool 422 is made up of a variable number of workers 424, and is configured by the resource manager 414 as described previously. Worker controller 424 manages the actual processing of a job. Multiple worker pool 422s can exist within the system on different resources (e.g., servers), and can contain different process types (e.g., workers 424).

Job manager 426 is a module that pops a job from job queue 416 when it is idle (e.g., just finished running another job) and sets up the computation. The setup process involves choosing which Secure Framework to use in the worker (e.g., SMPC framework A, B, C, etc.). Based on attributes of a job, job manager 426 selects the appropriate framework. An example of a secure framework is SCALE-MAMBA or SPDZ. One skilled in the art will appreciate that any type of SMPC framework may be used.

SMPC I/O 428 is a module that handles the communication from the secure engine process, and can read or write data from the secure process. Any data required from database 420 will be handled by this module. SMPC I/O 428 can also write back results to the results queue 418, and if needed, write back to database 420. If the job has secret arguments, SMPC I/O 428 may request the arguments from job manager 426 to write to the secure process.

Compute module 430 of a given framework (e.g., compute 430A of framework A and compute 430Z of framework Z) is responsible for starting the secure compute process for that SMPC framework. In some aspect, compute module 430 will need to first have some compiled function or byte code to execute, which can come from either the program manager 434 or compiler 438, depending on the framework.

Controller I/O module 432 of a given framework represents the input and output done from within the secure compute process started by compute module 430 for a particular framework.

Program manager 434 provides the byte code for the secure compute process to execute. In some aspects, manager 434 will first check cache 436 to see if the query type of a query and parameters of a data input have already been compiled and used on this worker. If a cache miss is returned, manager 434 requests compiler service 440 to provide the byte code. Manager 434 then saves the received code from compiler service 440 in the cache 436 for future use. It should be noted that the secure input data into the secure functions does not affect the byte code.

Cache 436 provides a cache for byte code where the key is the job type and parameters such as but not limited to number of rows, columns, batch size, and plain arguments.

Compiler 438 combines program manager 434, cache 436, and compiler service 440 into one, as this framework has a quick compiler, and does not need the added overhead of using another service. Some SMPC frameworks may not need compiler 438 or program manager 434.

Compiler service 440 is a module for compiling and caching byte code for secure execution. Its benefit is that for slow compilation, caching byte code that can be reused across all the workers 424 improves efficiency. It also means if resource manager 414 removes worker 424, the cached byte code still exists within service 440. Service 440 may also precompile a number of programs which are likely to be requested often. For example, suppose that a program can only process a maximum of X rows, then parameters of X rows is likely to be requested often for large datasets. Compiler 442 may take the query type and parameters of a query and first check cache 444 for an existing compilation. If one does not exist, compiler 442 may compile the byte code and store the result in cache for future use.

If client controller 300 has supplied a custom user function, the program code can either be (1) passed with the job arguments to worker 424, (2) automatically pushed to compiler service 440, where the job arguments and program manager 434 specify the program via some ID, and (3) automatically pushed to compiler 438, where the job arguments specify the program via some ID.

Figure 5:
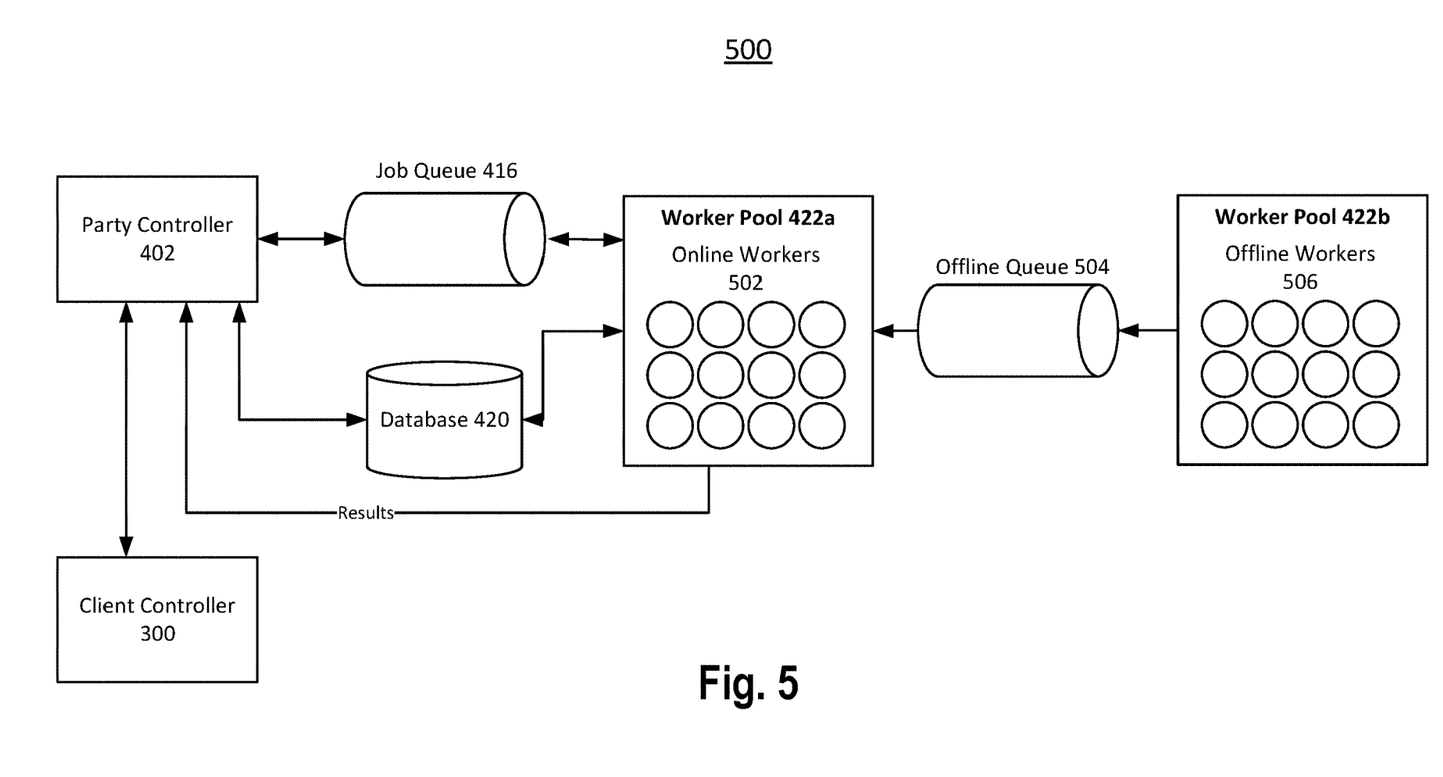
FIG. 5 is a detailed block diagram illustrating a system comprising offline workers for dynamic job performance in SMPC, in accordance with aspects of the present disclosure.

FIG. 5 is a detailed block diagram illustrating system 500 comprising offline workers for dynamic job performance in SMPC, in accordance with aspects of the present disclosure. As shown in FIG. 5, offline workers 506 of worker pool 422b generate offline data in a split format (e.g., the value of 10 may be split three ways into 3, 5, and 2). Offline workers 506 are known as producers in a typical queue model, as they are pushing data (e.g., Beaver triples) into the queues such as offline queue 504. Online workers 502 of worker pool 422a are known as the consumers of offline queue 504, and pop data from the queue in order to apply functions to the jobs data inputs (e.g., multiplication with Beaver triples). This improves the performance of the system as offline data is pre-generated for the online workers 502. As discussed before, resource manager 414 may adjust the number of workers in the pool. This applies to both online workers 502 and offline workers 506. In some aspects, worker pool 422a and worker pool 422b are comprised in the same worker pool 422. In other aspects, worker pool 422a and 422b are different worker pools, each dedicated to online workers and offline workers, respectively.

Figure 6:
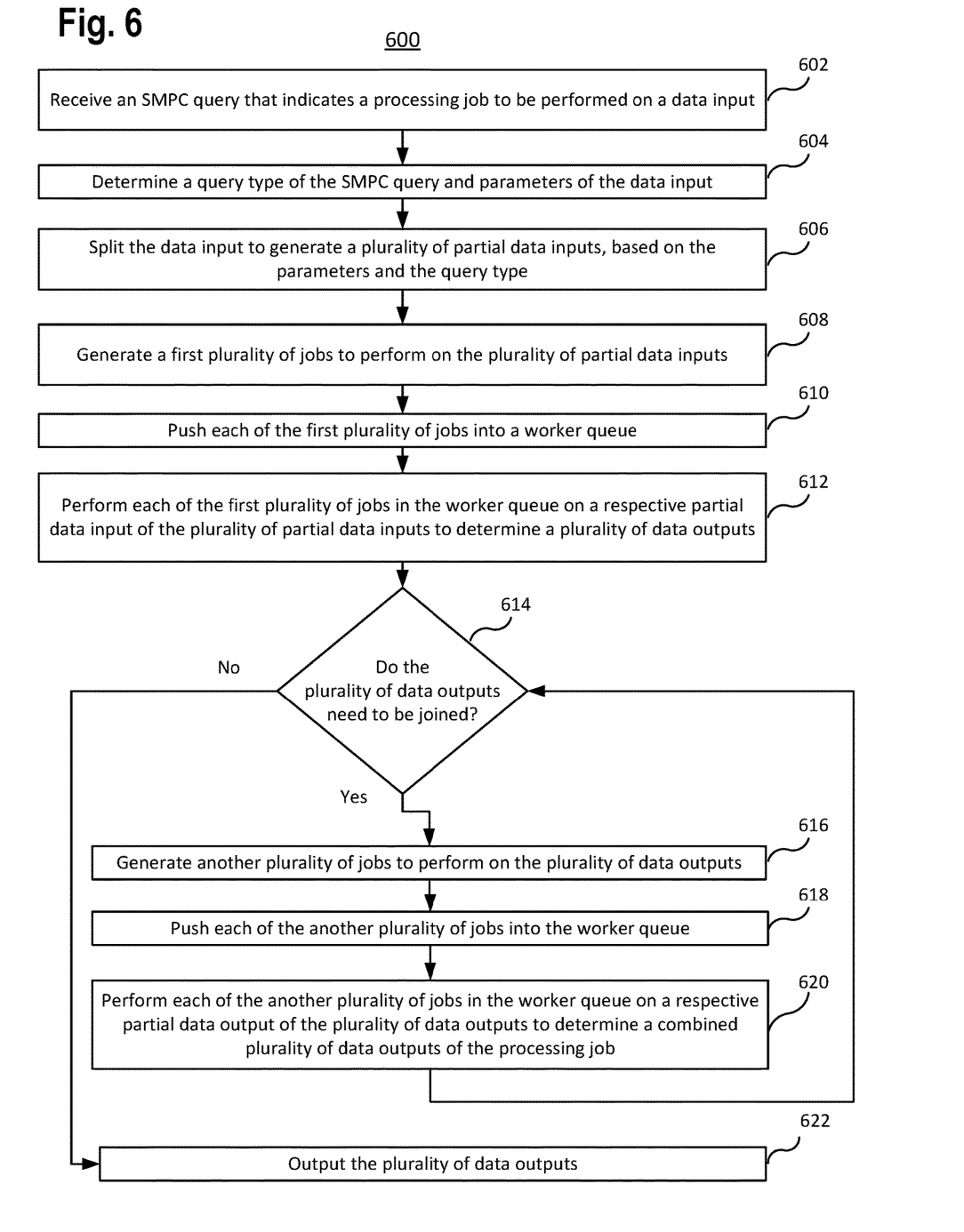
FIG. 6 illustrates a flow diagram of a method for dynamic job performance in SMPC, in accordance with aspects of the present disclosure.

FIG. 6 illustrates a flow diagram of method 600 for dynamic job performance in SMPC, in accordance with aspects of the present disclosure. At 602, the controller comprising client controller 102 and elements of SMPC compute party 101 receives an SMPC query that indicates a processing job to be performed on a data input. At 604, the controller determines a query type of the SMPC query and parameters of the data input. At 606, the controller splits the data input to generate a plurality of partial data inputs, based on the parameters and the query type.

At 608, the controller generates a first plurality of jobs to perform on the plurality of partial data inputs. At 610, the controller pushes each of the first plurality of jobs into a worker queue. At 612, the controller performs each of the first plurality of jobs in the worker queue on a respective partial data input of the plurality of partial data inputs to determine a plurality of data outputs. At 614, the controller determines whether the plurality of data outputs need to be joined or processed further.

In response to determining that the plurality of data outputs needs to be joined or processed further, at 616, the controller generates another plurality of jobs to perform on the plurality of data outputs. At 618, the controller pushes each of the another plurality of jobs into the worker queue. At 620, the controller performs each of the another plurality of jobs in the worker queue on a respective partial data output of the plurality of data outputs to determine a combined plurality of data outputs (i.e., a combined result) of the processing job. At 614, the controller again determines whether the combined plurality of data outputs need to be joined or processed further.

In response to determining, at 614, that the plurality of data outputs or the combined plurality of data outputs do not need to be joined, at 622, the controller outputs the combined plurality of data outputs (i.e., the combined result).

Figure 7:
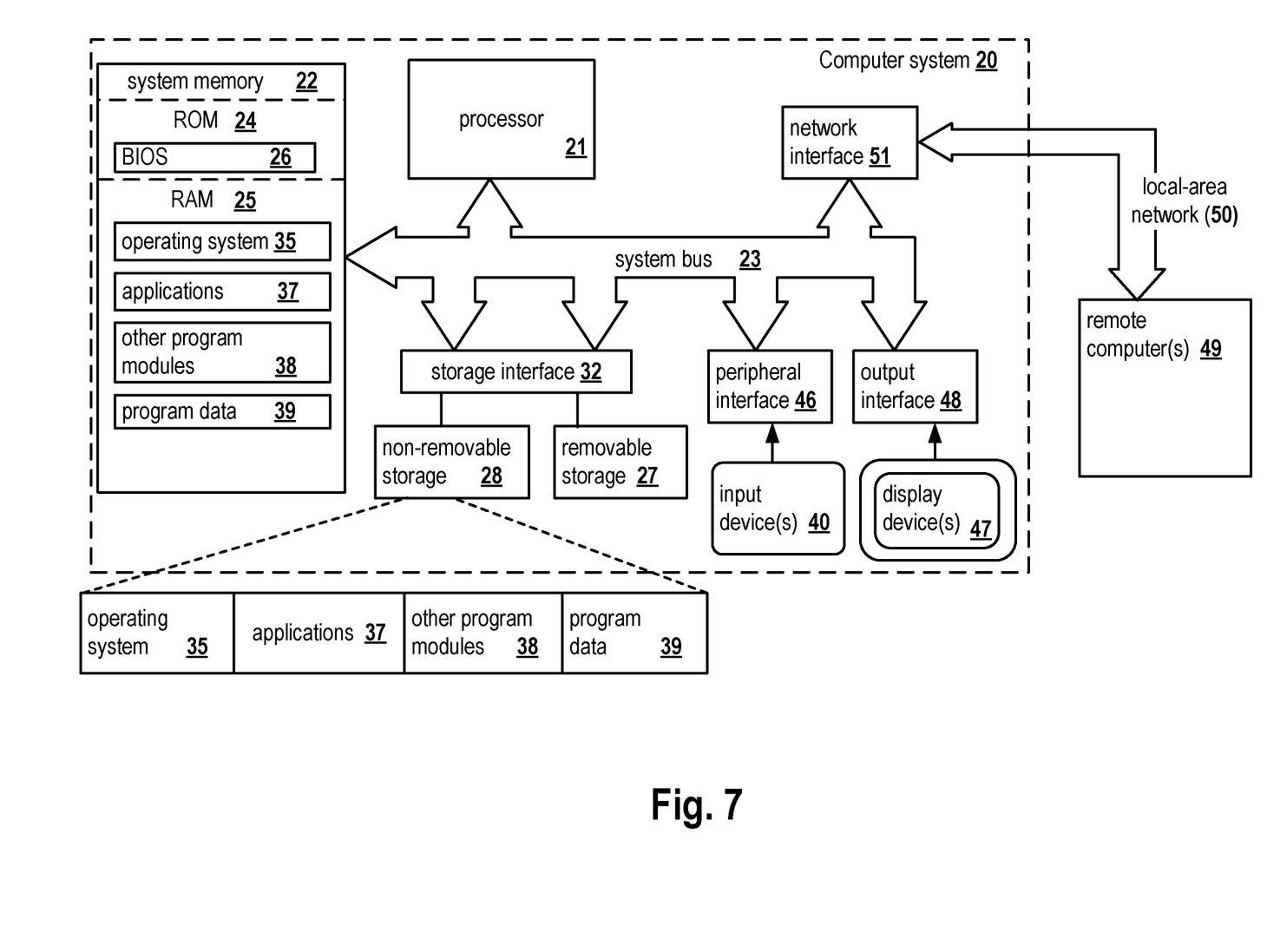
FIG. 7 presents an example of a general-purpose computer system on which aspects of the present disclosure can be implemented.

FIG. 7 is a block diagram illustrating a computer system 20 on which aspects of systems and methods for dynamic job performance in SMPC may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for dynamic job performance in secure multiparty computation (SMPC), the method comprising:
   receiving an SMPC query that indicates a processing job to be performed on respective data inputs from a plurality of nodes, wherein the SMPC query is received by all of the plurality of nodes from a client controller;
   determining a query type of the SMPC query and parameters of the data input;
   splitting each of the respective data inputs to generate a plurality of partial data inputs, based on the parameters and the query type;
   generating a first plurality of jobs based on the processing job to perform on the plurality of partial data inputs;
   pushing each of the first plurality of jobs into a worker queue;
   performing, by the plurality of nodes, each of the first plurality of jobs in the worker queue on a respective partial data input of the plurality of partial data inputs to determine a plurality of partial data outputs;
   in response to determining that the query type indicates that the plurality of data outputs should be joined, generating a second plurality of jobs based on the processing job to perform on the plurality of partial data outputs;
   pushing each of the second plurality of jobs into the worker queue; and
   performing, by the plurality of nodes, each of the second plurality of jobs in the worker queue on a respective partial data output of the plurality of partial data outputs to determine a combined result of the processing job.

2. The method of claim 1, wherein each of the plurality of nodes comprises a pool of worker processes that perform a plurality of jobs pushed into the worker queue, wherein the plurality of jobs comprises at least the first plurality of jobs and the second plurality of jobs, and wherein a respective worker process of the pool performs a respective job popped from the worker queue until all of the plurality of jobs are complete.

3. The method of claim 2, wherein the pool of worker processes communicate with a respective pool of worker processes on each of the plurality of nodes, and wherein results associated with SMPC queries from each of the nodes are exchanged using tokens that identify a respective result, a respective node, and the SMPC query.

4. The method of claim 2, further comprising:
   increasing an amount of worker processes in the pool of worker processes in response to receiving the SMPC query; and
   decreasing the amount of worker processes in the pool in response to determining the combined result.

5. The method of claim 4, wherein the amount of worker processes is at least one of: proportional to an amount of jobs in the first plurality of jobs and, less than a maximum amount of workers.

6. The method of claim 4, wherein increasing and decreasing the amount of worker processes in a worker pool is based on at least one of: required computation, time of day, date, financial costs, power consumption, and available network bandwidth.

7. The method of claim 1, wherein the first plurality of jobs and the second plurality of jobs may comprise at least one of:
(1) sorting,
(2) filtering,
(3) mapping,
(4) reducing, and
(5) performing a mathematical operation.

8. The method of claim 1, wherein the combined result is stored as one of a secret share, a hash value, or a plaintext value.

9. The method of claim 1, further comprising:
caching the SMPC query and the combined result;
receiving another SMPC query;
in response to determining that the another SMPC query matches the SMPC query, outputting the cached combined result.

10. The method of claim 1, further comprising:
caching the plurality of partial data inputs and the first plurality of jobs;
receiving another SMPC query comprising another data input;
splitting the another data input into a third plurality of jobs such that the third plurality of jobs comprises the first plurality of jobs and a plurality of another partial data inputs comprises the plurality of partial data inputs;
determining that a partial result of performing the third plurality of jobs on the plurality of another partial data inputs is the plurality of data outputs from the first plurality of jobs; and
performing a remainder of the third plurality of jobs on a remainder of the plurality of another partial data inputs.

11. The method of claim 1, further comprising:
subsequent to receiving the SMPC query, receiving another SMPC query; and
appending another data input of the another SMPC query to the data input of the SMPC query.

12. The method of claim 11, further comprising pushing jobs associated with the SMPC query and the another SMPC query in parallel.

13. The method of claim 1, wherein the data input is a secret share, received from a client controller, that is encoded or has additional encoding such that contents of the data input are securely searchable.

14. The method of claim 1, wherein generating the first plurality of jobs to perform on the plurality of partial data inputs further comprises automatically compiling at least one program to execute on the plurality of partial data inputs, wherein the at least one program is cached.

15. The method of claim 1, wherein the data input is one of:
(1) an output from a secure function;
(2) data stored in an internal database;
(3) data retrieved from an external database; and
(4) included as a parameter of the SMPC query.

16. The method of claim 1, further comprising:
outputting, to a client controller, a progress of job completion, wherein completion of each respective job of the first plurality of jobs and the second plurality of jobs is monitored and displayed as the progress.

17. The method of claim 1, further comprising:
verifying each respective result of the plurality of data outputs subsequent to performing each of the first plurality of jobs; and
in response to detecting an error in a respective message authentication code associated with a respective result, re-performing a respective job of the first plurality of jobs on a respective partial data input of the plurality of partial data inputs, wherein the respective job and the respective partial data input correspond to the respective result with the error.

18. A system for dynamic job performance in secure multiparty computation (SMPC), the system comprising:
at least one hardware processor configured to:
receive an SMPC query that indicates a processing job to be performed on respective data inputs from a plurality of nodes, wherein the SMPC query is received by all of the plurality of nodes from a client controller;
determine a query type of the SMPC query and parameters of the data input;
split each of the respective data inputs to generate a plurality of partial data inputs, based on the parameters and the query type;
generate a first plurality of jobs based on the processing job to perform on the plurality of partial data inputs;
push each of the first plurality of jobs into a worker queue;
perform, by the plurality of nodes, each of the first plurality of jobs in the worker queue on a respective partial data input of the plurality of partial data inputs to determine a plurality of partial data outputs;
in response to determining that the query type indicates that the plurality of data outputs should be joined, generate a second plurality of jobs based on the processing job to perform on the plurality of partial data outputs;
push each of the second plurality of jobs into the worker queue; and
perform, by the plurality of nodes, each of the second plurality of jobs in the worker queue on a respective partial data output of the plurality of partial data outputs to determine a combined result of the processing job.

19. A non-transitory computer readable medium storing thereon computer executable instructions for dynamic job performance in secure multiparty computation (SMPC), including instructions for:
receiving an SMPC query that indicates a processing job to be performed on respective data inputs from a plurality of nodes, wherein the SMPC query is received by all of the plurality of nodes from a client controller;
determining a query type of the SMPC query and parameters of the data input;
splitting each of the respective data inputs to generate a plurality of partial data inputs, based on the parameters and the query type;
generating a first plurality of jobs based on the processing job to perform on the plurality of partial data inputs;
pushing each of the first plurality of jobs into a worker queue;
performing, by the plurality of nodes, each of the first plurality of jobs in the worker queue on a respective partial data input of the plurality of partial data inputs to determine a plurality of partial data outputs;

in response to determining that the query type indicates that the plurality of data outputs should be joined, generating a second plurality of jobs based on the processing job to perform on the plurality of partial data outputs;

pushing each of the second plurality of jobs into the worker queue; and performing, by the plurality of nodes, each of the second plurality of jobs in the worker queue on a respective partial data output of the plurality of partial data outputs to determine a combined result of the processing job.

* * * * *